(12) United States Patent
Van Blokland

(10) Patent No.: US 10,787,319 B2
(45) Date of Patent: Sep. 29, 2020

(54) NOSE BAR FOR A CONVEYOR ELEMENT AND CONVEYOR COMPRISING SUCH NOSE BAR

(71) Applicant: Radie B.V., BC Culemborg (NL)

(72) Inventor: Johannes Josephus Antonius Van Blokland, BG Laren (NL)

(73) Assignee: Radie B.V. (NL)

( * ) Notice: Subject to any disclaimer, the term of this patent is extended or adjusted under 35 U.S.C. 154(b) by 0 days.

(21) Appl. No.: 16/269,016

(22) Filed: Feb. 6, 2019

(65) Prior Publication Data
US 2019/0241370 A1 Aug. 8, 2019

(30) Foreign Application Priority Data
Feb. 6, 2018 (EP) .................................... 18155391

(51) Int. Cl.
| | |
|---|---|
| *B65G 15/60* | (2006.01) |
| *B65G 23/44* | (2006.01) |
| *A21C 9/08* | (2006.01) |
| *B65G 23/04* | (2006.01) |
| *B65G 39/07* | (2006.01) |
| *B65G 39/12* | (2006.01) |

(52) U.S. Cl.
CPC ................ *B65G 15/60* (2013.01); *A21C 9/08* (2013.01); *B65G 23/04* (2013.01); *B65G 23/44* (2013.01); *B65G 39/07* (2013.01); *B65G 39/12* (2013.01); *B65G 2201/0202* (2013.01)

(58) Field of Classification Search
CPC ........ B65G 15/60; B65G 15/62; B65G 23/04; B65G 23/44; B65G 39/07; B65G 39/073; B65G 39/09; B65G 39/12; B65G 39/16; B65G 2201/0202; B65G 2201/0205; A21C 9/08
See application file for complete search history.

(56) References Cited

U.S. PATENT DOCUMENTS

| | | | |
|---|---|---|---|
| 3,354,735 A | 11/1967 | Holz | |
| 4,499,988 A * | 2/1985 | Gasser | B65G 47/647 198/369.2 |

(Continued)

FOREIGN PATENT DOCUMENTS

DE 202012101542 U1 * 4/2013 ............. B65G 15/60

OTHER PUBLICATIONS

Extended European Search Report for 18155391.8 dated Aug. 17, 2018.

*Primary Examiner* — Gene O Crawford
*Assistant Examiner* — Keith R Campbell
(74) *Attorney, Agent, or Firm* — Katten Muchin Rosenman LLP

(57) ABSTRACT

A nose bar for a conveyor element with a frame part, having a head end including a gutter with a circle segment shaped cross section, a rod with a circular cross section, having a radius equal to the circle segment of the cross section in which the circular surface of the rod is arranged directly against the gutter of the frame part. A conveyor, and a production line, in particular for dough products, including a nose bar with a frame part, having a head end including a gutter with a circle segment shaped cross section, a rod with a circular cross section in which the circular surface of the rod is arranged directly against the gutter of the frame part.

18 Claims, 5 Drawing Sheets

(56) References Cited

U.S. PATENT DOCUMENTS

| | | | | |
|---|---|---|---|---|
| 5,031,747 A | * | 7/1991 | Menzel | B65G 11/023 |
| | | | | 193/2 R |
| 5,605,222 A | | 2/1997 | Huberty et al. | |
| 5,957,265 A | | 9/1999 | Clopton | |
| 6,298,981 B1 | | 10/2001 | Hosch et al. | |
| 6,422,382 B1 | * | 7/2002 | Ertel | B65G 21/02 |
| | | | | 198/841 |
| 6,938,754 B2 | * | 9/2005 | Kanaris | B65G 39/073 |
| | | | | 198/494 |
| 7,021,450 B2 | * | 4/2006 | Jones, Jr. | B65G 21/14 |
| | | | | 198/418.9 |
| 7,837,029 B2 | * | 11/2010 | Russell | B65G 17/086 |
| | | | | 198/850 |
| 8,297,846 B2 | * | 10/2012 | Meyer | B65G 39/09 |
| | | | | 193/37 |
| 8,579,774 B2 | * | 11/2013 | Derscheid | A01F 15/18 |
| | | | | 198/835 |
| 9,387,990 B2 | * | 7/2016 | Tagawa | B65G 23/02 |
| 2006/0151294 A1 | | 7/2006 | Hosch et al. | |

\* cited by examiner

Fig. 1a (state of the art)

Fig. 2a (state of the art)

Fig. 3a (state of the art)

(state of the art)

(state of the art)

NOSE BAR FOR A CONVEYOR ELEMENT AND CONVEYOR COMPRISING SUCH NOSE BAR

BACKGROUND

The present invention relates to a nose bar for a conveyor belt-guide and a conveyor comprising such nose bar. Conveyor belts are widely used in manufacturing and product handling environments. Dough sheet and product handling is one of them. As the demand for higher production yields and thus speeds increases, the requirements set to in particular the operation speeds of the conveyor belts become higher and higher.

With higher speeds, the heat generated in the shafts or drums about which the conveyor belts are moved increases as well. Such heat may be caused by friction forces between the conveyor-belt and the shafts or drums, or by friction between the shafts or drums and their bearings. The heat generation and/or temperatures lead to the risk of damaging the shafts, drums, bearings or conveyor belt, the later in particular when the conveyor is stopped or paused. Then the belts tend to degrade.

In dough handling, having interfaces between two conveyor belts is unavoidable, but the interfaces form a risk of causing irregularities in the arrangement of the dough products on the conveyor, or even damage the dough products. Herein, the larger the diameter of the drum or shaft at the nose of the conveyor, the larger the gap that occurs, and the higher the risks involved.

For that reason, it is desired to have the sharpest so called noses on the conveyors. However, a sharper nose implies a sharper turn of the conveyor belt and thus a shaft or drum with a smaller diameter. Such shaft or drum implicitly has less volume and has to rotate faster with the same belt-speed, which leads to an increased heating of the shaft or drum, which has the disadvantages described above.

SUMMARY

It is a goal of the present invention to take away the disadvantages of the prior art, and/or at least to provide a useful alternative to the prior art.

The present invention thereto proposes a nose bar for a conveyor element, comprising a frame part, having a head end comprising a gutter with a circle segment shaped cross section and a rod with a circular cross section, having a radius equal to the circle segment of the cross section wherein the circular surface of the rod is arranged directly against the gutter of the frame part.

The gutter with a circle segment shaped cross section enables to receive the rod in a form fitting manner, wherein the circular surface of the rod is arranged directly against the gutter. This way the rod is able to contact the entire surface of the gutter over the length of the rod or the gutter, whichever is longer. Such surface is larger than the contact surfaces of state of the art configurations, wherein a shaft or drum is mounted rotatable about an axis, and wherein the contact surface is for instance formed by one or more suspension points for the shaft or drum. The larger surface allows heat transfer from the rod to the frame.

The nose bar for a conveyor element according to the present invention thus provides as a first advantage that due to the increased heat transfer surface, the temperature of the rod remains lower during use. This decreases the risk of damage of a conveyor-belt tensioned around the rod. A further advantage is that the rod is also supported mechanically by the gutter, which lowers the risk of deformation and uneven wear.

BRIEF DESCRIPTION OF THE DRAWINGS

FIGS. 1a, 2a, 3a, 4a, and 5a show cross sections of nose bars of conveyor elements according to the state of the art;

FIG. 10b shows a front view of the gutter from FIG. 10a.

DETAILED DESCRIPTION

Figure 1B:
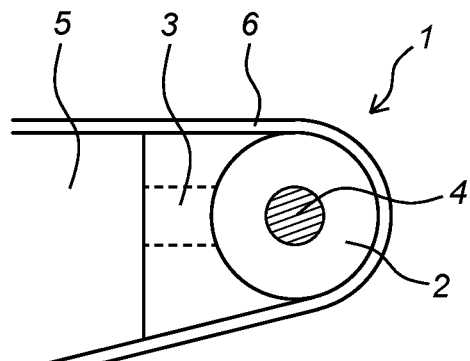
FIGS. 1b, 2b, 3b, 4b, 5b, 6, and 7 show cross sections of nose bars of conveyor elements according to an embodiment of the invention.
Figure 1B:
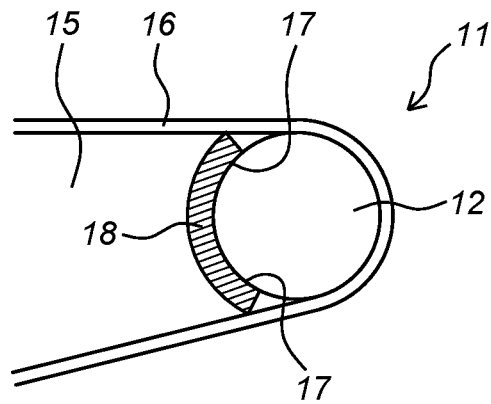

In a preferred embodiment, the frame part is made of a metal and at least the surface of the gutter of the frame part and/or at least the circular surface of the rod is provided with a bearing material such as a food grade bearing material. A metal frame part has a high temperature capacity and is able to drain heat from the rod. The rod may comprise a metal for the same reason. The bearing material protects both the gutter surface and the rod.

In an embodiment, the rod is entirely made from the bearing material. This embodiment may be easy to manufacture, since such rod can for instance be extruded or molded from a plastics material and no further processing steps are required. The rod is in that embodiment the most likely part subject to wear and tear, which makes maintenance straightforward. Since heat is generated at the surface of the rod, it can be easily absorbed by the frame part, in particular when the frame part is made out of metal.

In a further embodiment, the frame part is provided with a liner of bearing material. In that case, both the frame part and the rod may be made of metal, in order to obtain the highest heat capacity. The liner of bearing material may have a lower heat transfer rate than the metals used for the frame part and the rod. For that reason, one may aim at a liner that is as thin as possible, in order to obtain the highest heat transfer from the rod to the frame. On the other hand, the thinner the bearing material, the more often it needs replacement. It was found that an optimal thickness is between 0.2 and 4.0 and preferably between 0.5 and 2.0 mm.

Evidently such thickness is dependent on the materials chosen. The frame may for instance be made from stainless steel and the bearing material is for instance a plastics polymer material, in particular a material of plain bearings. Possible materials may be polyoxymethyleen (POM), polyamid (PA), polyethyleentereftalaat (PETP) or polytetrafluorethylen (PTFE). Dependent on the embodiment the rod may be made from the bearing material, lined with the bearing material or be made from stainless steel too.

Preferably a material is selected with a low friction coefficient, that is, a value between 0.05 and 0.25 and preferably between 0.05 and 0.18.

The above bearing material materials may be applied as a part or pre-shaped element. Alternatively, the liner of bearing material may be applied as a coating. The same materials may for instance be applied, but in that case, a thinner layer may be obtained.

In a further embodiment the rod comprises sections with a larger diameter, wherein the frame part has grooves that are deeper than the sections with the larger diameter. These sections are provided for increasing the grip of the conveyor belt on the rod and prevent slipping of the conveyor belt over the rod, which may cause unwanted heat generation. The grooves in the frame part avoid locally that the rod engages the frame part.

This is in particular desired when the sections with a higher diameter are provided with a texture, in particular with knurls. This texture increases the grip between the conveyor belt and the rod, but between the rod and the frame, the smoothest contact possible is desired.

The rod may be integrally formed as one single part, but it may also be an assembly.

For removing scrape due to friction, dirt and/or remainings of dough products, such as flour, part of the gutter surface or part of the rod may be provided with grooves for draining such dirt. Such grooves may have a direction with a diagonal component with respect to an axis of rotation of the rod. Furthermore the thickness of the frame part adjacent to the rod may be smaller than the diameter of the rod. This has as a result that the conveyor belt is not scraped over an edge of the frame, but lifted by the rod, which prevents damage to the belt.

The frame part may have a tapered cross section with a decreasing thickness toward the gutter.

Once the conveyor belt is tensioned around the rod, it needs no further suspension, but for maintenance purposes and in particular for trouble free removal of the belt, the rod may be suspended, for instance at its distal ends and in particular solely at its distal ends.

The present invention is in particular beneficial for sharp conveyor ends, and thus for relatively small rod diameters. The diameter of the rod according to the present invention is therefore preferably smaller than 35 mm and in particular between 5 and 35 mm.

The invention also relates to a conveyor, comprising a conveyor belt and a conveyor element, wherein the conveyor element comprises at least one nose bar as described above and at least a second nose bar, wherein the conveyor belt is arranged to circulate over both nose bars. The second nose bar may, but does not need to be a nose bar according to the invention. Configurations with more than two nose bars are thinkable too, in particular in configurations for retracting units (which are conveyors with a retractable nose). The invention also relates to a production line, in particular a dough line comprising such conveyor or nose bar.

Figure 8:
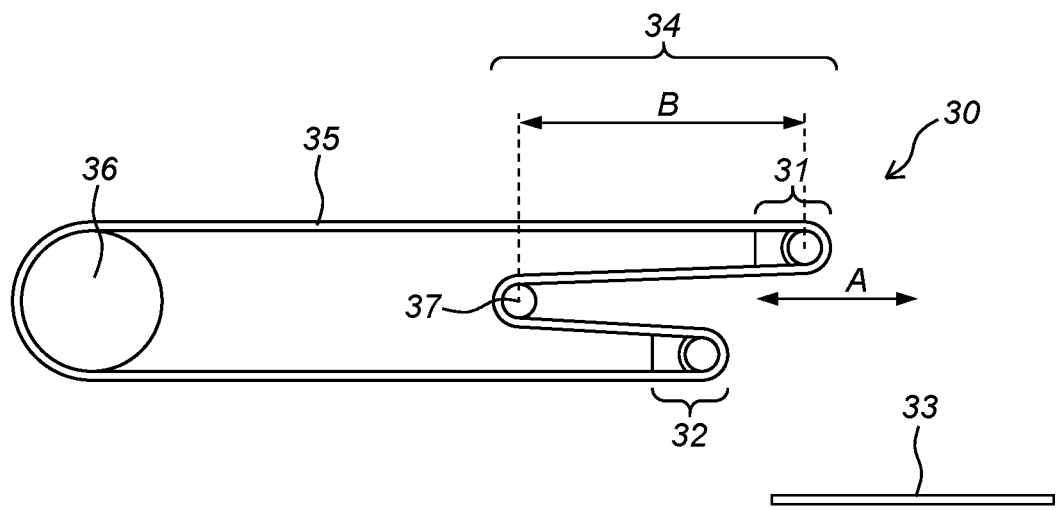
FIG. 8 shows a specific embodiment of the present invention.

The invention will now be elucidated into more detail with reference to the following figures. Herein:

FIGS. 1a-5a show cross sections of nose bars of conveyor elements according to the state of the art;

FIGS. 1b, 2b, 3b, 4b, and 5b, 6 and 7 show cross sections of nose bars of conveyor elements according to an embodiment of the invention;

FIG. 8 shows a specific embodiment of the present invention; and

Figure 9:
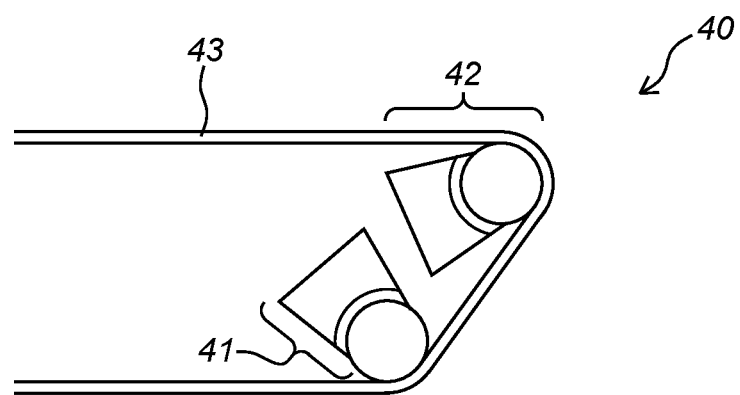
FIG. 9 shows another embodiment according to the invention.

FIG. 9 shows another embodiment according to the invention.

Figure 10A:
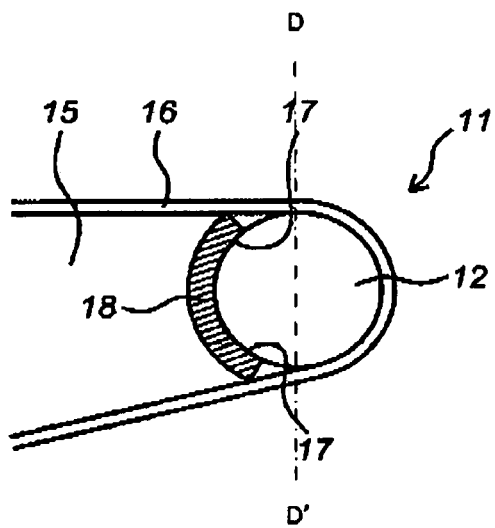
FIG. 10a shows a cross section of a frame part, gutter, rod, nose bar, and conveyor element according to an embodiment of the invention
Figure 10B:
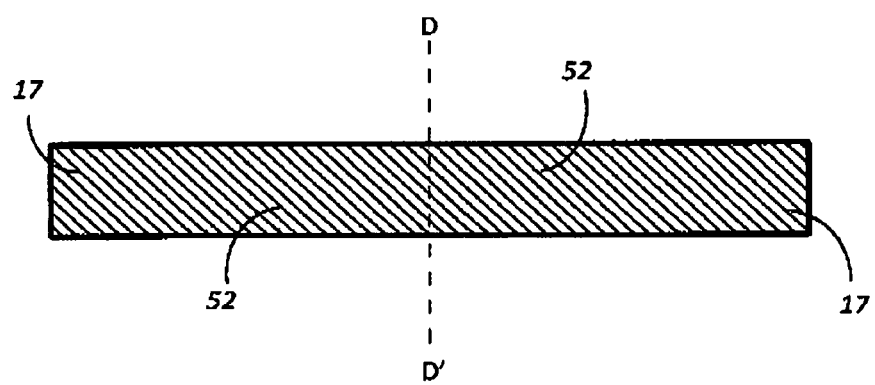

FIG. 10a shows a cross section of a frame part, gutter, rod, nose bar, and conveyor element according to an embodiment of the invention and FIG. 10b shows a front view of the gutter from FIG. 10a.

FIG. 1a shows a nose bar 1 of a conveyor-belt 6 guide according to the state of the art, wherein a drum 2 is suspended on a shaft 4 which is mounted to a frame 5 by means of a spacer 3. Heat is generated between the conveyor belt 6 and the drum 2, and between the drum 2 and the shaft 4. A part of the heat is drained by the conveyor belt itself. The rest of the heat can be drained to the frame 5 via the spacer 3.

FIG. 1b shows a nose bar 11 of a conveyor-belt 16 guide according to the present invention comprising a frame 15 having a gutter 17 with a circular cross section, which is lined with a bearing material 18. The gutter 17 (and the bearing 18) have a circular cross section with a diameter that matches the diameter of a rod 12, so that the rod 12, which is arranged directly against the gutter 17 of the frame part 15, is received form fittingly in the gutter 17.

Figure 2B:
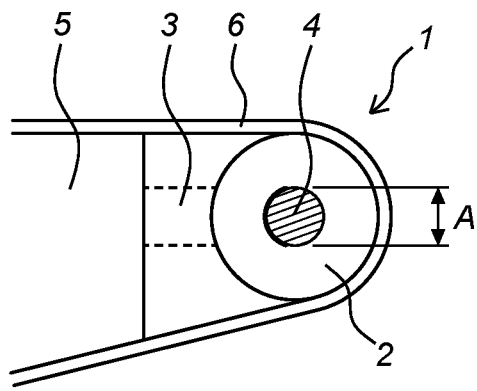
Figure 2B:
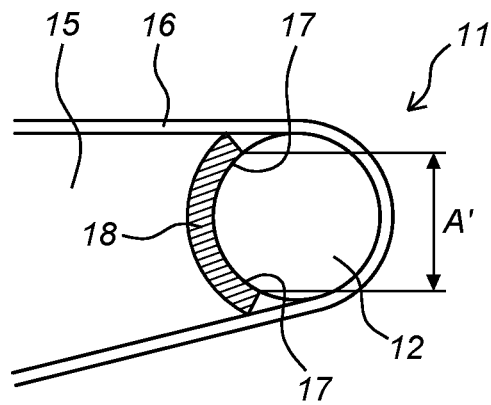

FIGS. 2a and 2b show the respective nose bars 1, 11 of the conveyor elements from FIGS. 1a and 1b. In the figures, a size A of a contact surface for draining heat from the drum 2 to the frame 5 is smaller compared to the diameter of the drum 2 than the size A' of the contact surface for draining heat from the rod 12 to the frame 15, compared to the diameter of the rod 12. It is emphasized that the drawings need not necessarily have the same scale. From the figures it appears that the same surface for heat transfer may be obtained with a nose bar of a conveyor element according to the invention, for a rod that is smaller than a drum according to the prior art.

Figure 3B:
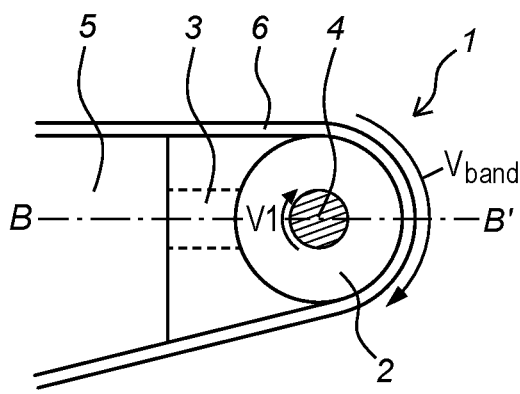
Figure 3B:
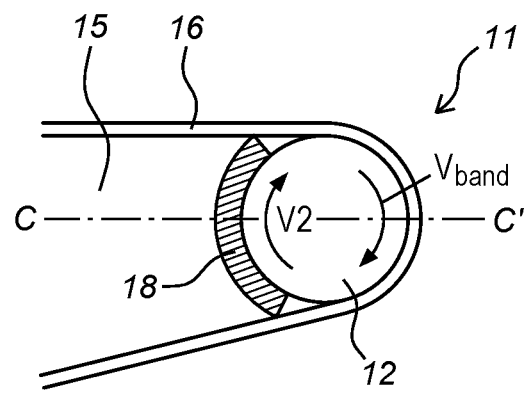

FIGS. 3a and 3b show the same nose bars 1, 11 of the conveyor elements from FIGS. 1a and 1b once again, now with an indication of relative rotational speeds for the case that the rod 12 has the same diameter as the drum 2. It is visible that in the configuration of FIG. 3a, the speed V1 between the surfaces of the shaft 4 and the drum 2 are smaller than the speed V2 at the surface of the rod 12 and the liner 18.

Figure 4A:
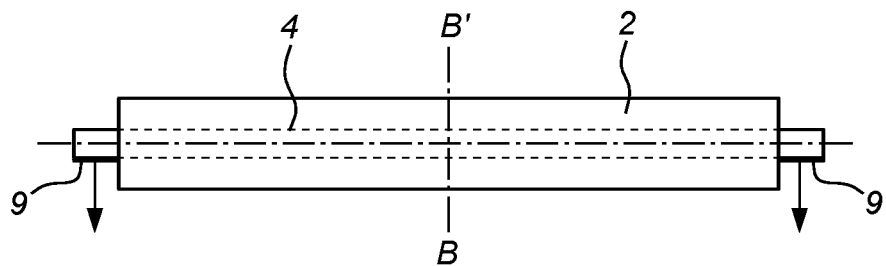
Figure 4B:
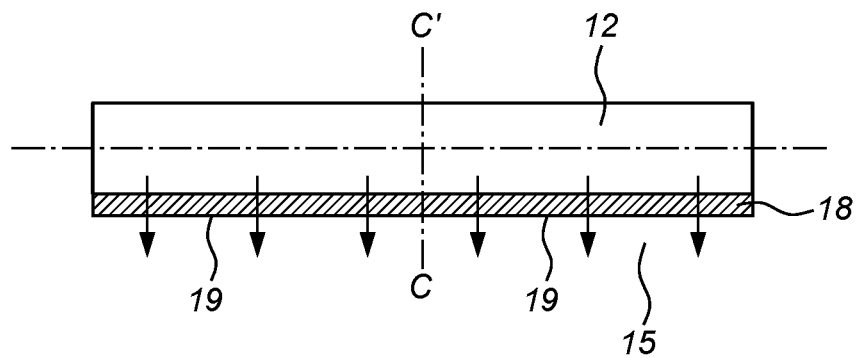

At first sight this seems a disadvantage of the configuration of the advantage, but FIGS. 4a and 4b, showing cross sections in the respective directions B-B' and C-C' in FIGS. 3a, 3b, show the respective surfaces 9 and 19 for heat transfer. As it appears from the figures, the surface 19 according to the invention for heat transfer is larger than the surface 9 according to the state of the art.

Figure 5A:
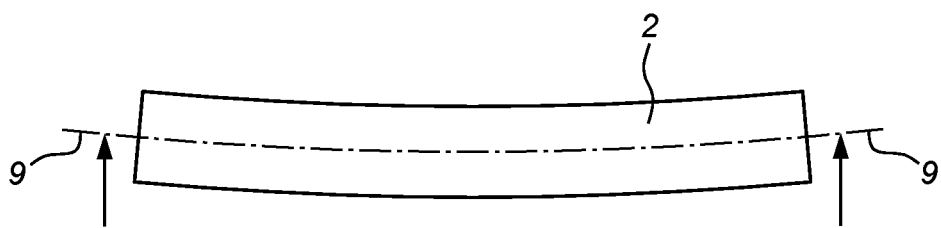
Figure 5B:
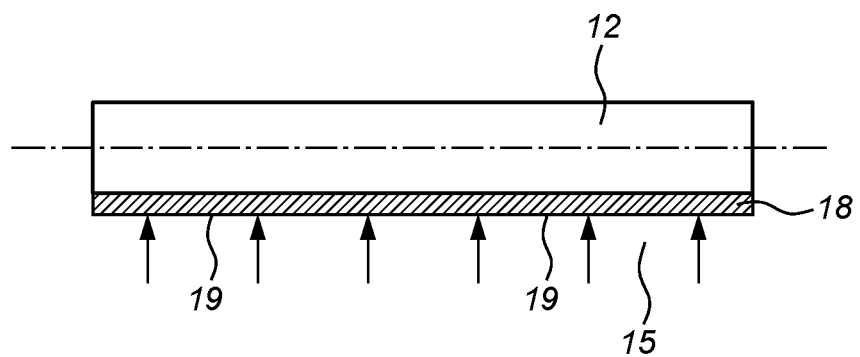

FIGS. 5a and 5b show that there is also a better mechanical support for the bar 12 than for the drum 2, which is beneficial for both the bar 12 and the conveyor belt (not depicted).

Figure 6:
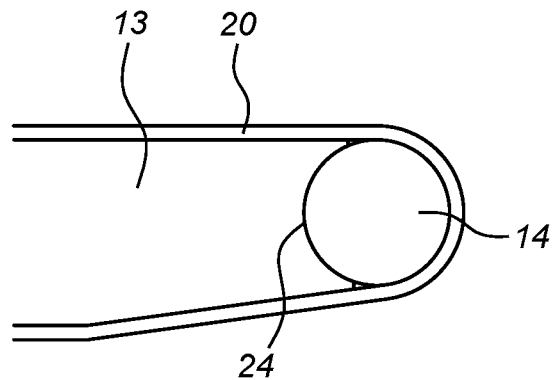

FIG. 6 shows an alternative embodiment, wherein the frame 13 is made of a metal, thus having a large heat capacity, and the bar 14 is entirely made of a bearing material. The belt 20 is in contact with the bearing material in this embodiment too. Like in the other embodiments, the frame 13 is tapered with a decreasing thickness toward its gutter 24.

Figure 7:
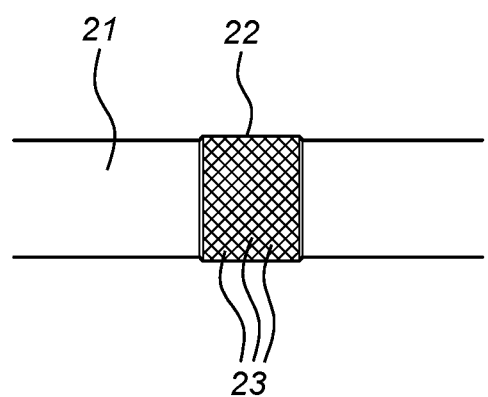

FIG. 7 shows a rod 21 for use in the present invention, having a section 22 with a higher diameter, that is provided with a texture, in particular with knurls 23.

FIG. 8 shows an embodiment 30 of a conveyor according to the present invention, comprising a so called retracting unit 34 wherein dough is placed from conveyor belt 35 onto conveyor belt 33. The embodiment 30 comprises a nose bar 31 according to the present invention. Configurations wherein besides nose bar 31 other nose bars, for example nose bar 32 and nose bar 37, are nose bars according to the invention are thinkable too. Nose bars 31 and 37 are positioned at a fixed distance B from each other and are together arranged movably in the direction A. The conveyor belt 35 is looped around further roller 36.

FIG. 9 shows yet another embodiment 40 of a conveyor according to the present invention, wherein a conveyor belt 43 is looped around two nose bars 41, 42 according to the present invention. The embodiments shown serve as examples only and do not limit the scope of the invention as defined in the following claims.

FIG. 10a shows a cross section of a frame part 15, gutter 17, rod 12, nose bar 11, and conveyor element 16 according to an embodiment of the invention with line D-D' bisecting rod 12. FIG. 10b shows a front view of the gutter 17 if viewed from line D-D' turned ninety degrees (90°) from the cross-section view of FIG. 10a. Shown in FIG. 10b, gutter 17 includes grooves 52. Grooves 52 as shown have a direction with a diagonal component with respect to an axis of rotation of the rod 12.

The invention claimed is:

1. A nose bar for a conveyor element, comprising:
    a frame part, having a head end comprising a gutter with a circle segment shaped cross section;
    a rod with a circular cross section, having a radius equal to the circle segment of the cross section;
    wherein
    the circular surface of the rod is arranged directly against the gutter of the frame part and
    the rod contacts the entire surface of the gutter over the length of the rod.

2. The nose bar for a conveyor element according to claim 1, wherein:
    the frame part is made of a metal; and
    at least the surface of the gutter of the frame part, and/or at least the circular surface of the rod, is provided with a bearing material, in which the bearing material is a food grade bearing material.

3. The nose bar for a conveyor element according to claim 2, wherein the bearing material is applied as a coating.

4. The nose bar for a conveyor element according to claim 2, wherein the rod is entirely made from the bearing material.

5. The nose bar for a conveyor element according to claim 2, wherein the frame part is provided with a liner of said bearing material.

6. The nose bar for a conveyor element according to claim 5, wherein the liner has a thickness between 0.2 and 4.0 mm.

7. The nose bar for a conveyor element according to claim 1, wherein the rod comprises sections with a larger diameter.

8. The nose bar for a conveyor element according to claim 7, wherein the sections with a larger diameter are provided with knurls.

9. The nose bar for a conveyor element according to claim 1, wherein a part of the gutter or a part of the rod has grooves for draining dirt.

10. The nose bar for a conveyor element according to claim 9, wherein the grooves have a direction with a diagonal component with respect to an axis of rotation of the rod.

11. The nose bar for a conveyor element according to claim 1, wherein a thickness of the frame part adjacent to the rod is smaller than the diameter of the rod.

12. The nose bar for a conveyor element according to claim 1, wherein the frame part has a tapered cross section with a decreasing thickness toward the gutter.

13. The nose bar for a conveyor element according to claim 1, wherein the rod is suspended solely at its distal ends.

14. The nose bar for a conveyor element according to claim 1, wherein the diameter of the rod is smaller than 35 mm.

15. A conveyor comprising a conveyor belt and a conveyor element, wherein the conveyor element comprises at least one nose bar according to claim 1 and a second nose bar, wherein the conveyor belt is arranged to circulate over both nose bars.

16. A production line for dough products, comprising a conveyor according to claim 15.

17. The nose bar for a conveyor element according to claim 5, wherein the liner has a thickness between 0.5 and 2.0 mm.

18. The conveyor of claim 15 further comprising a third nose bar comprising:
    a frame part, having a head end comprising a gutter with a circle segment shaped cross section; and
    a rod with a circular cross section, having a radius equal to the circle segment of the cross section;
    wherein
    the circular surface of the rod is arranged directly against the gutter of the frame part and
    the rod contacts the entire surface of the gutter over the length of the rod.

* * * * *